United States Patent
Fell et al.

(10) Patent No.: US 8,555,717 B2
(45) Date of Patent: Oct. 15, 2013

(54) VIBRATING STRUCTURE GYROSCOPES

(75) Inventors: Christopher Fell, Plymouth (GB);
Rebecca Eley, Plymouth (GB)

(73) Assignee: Atlantic Inertial Systems Limited, Devon (GB)

( * ) Notice: Subject to any disclaimer, the term of this patent is extended or adjusted under 35 U.S.C. 154(b) by 291 days.

(21) Appl. No.: 13/003,468

(22) PCT Filed: Jul. 10, 2009

(86) PCT No.: PCT/GB2009/050824
§ 371 (c)(1),
(2), (4) Date: Feb. 8, 2011

(87) PCT Pub. No.: WO2010/007406
PCT Pub. Date: Jan. 21, 2010

(65) Prior Publication Data
US 2011/0167911 A1 Jul. 14, 2011

(30) Foreign Application Priority Data
Jul. 12, 2008 (GB) .................................. 0812788.8

(51) Int. Cl.
*G01C 19/56* (2012.01)
(52) U.S. Cl.
USPC ..................................... 73/504.13; 73/504.12
(58) Field of Classification Search
USPC ................. 73/504.13, 504.12, 504.04, 504.02
See application file for complete search history.

(56) References Cited

U.S. PATENT DOCUMENTS

| 5,226,321 | A | 7/1993 | Varnham et al. |
| 5,447,601 | A | 9/1995 | Norris |
| 5,932,804 | A | 8/1999 | Hopkin et al. |
| 6,272,925 | B1 | 8/2001 | Watson |
| 6,276,205 | B1 | 8/2001 | McNie et al. |
| 7,040,162 | B2 * | 5/2006 | Lehureau et al. .......... 73/504.12 |

(Continued)

FOREIGN PATENT DOCUMENTS

| EP | 0 461 761 A1 | 12/1991 |
| EP | 0 859 219 A2 | 8/1998 |

(Continued)

OTHER PUBLICATIONS

International Search Report (PCT/ISA/210) for PCT/GB2009/050824 dated Aug. 26, 2010.

(Continued)

*Primary Examiner* — Helen Kwok
(74) *Attorney, Agent, or Firm* — Buchanan Ingersoll & Rooney PC

(57) ABSTRACT

An exemplary vibrating structure gyroscope includes a ring structure, an external frame and a flexible support including a pair of symmetrical compliant legs arranged to retain the ring structure within the external frame. A metal track is provided on an upper surface of the ring structure, the compliant legs and the external frame, over an insulating surface oxide layer. Each flexible support is arranged to carry a metal track associated with a single drive or pick-off transducer. The metal track is repeated for eight circuits, one circuit for each transducer. Each circuit of metal track associated with a transducer begins at a first bond-pad on the external frame, runs along a first compliant leg, across an eighth segment of the ring structure and back along the other compliant leg to a second bond-pad on the external frame.

16 Claims, 8 Drawing Sheets

(56) References Cited

U.S. PATENT DOCUMENTS

| | | | |
|---|---|---|---|
| 7,219,529 | B2 | 5/2007 | Fell et al. |
| 7,240,533 | B2 | 7/2007 | Fell et al. |
| 7,992,438 | B2 * | 8/2011 | Lo et al. ............... 73/504.13 |
| 8,250,919 | B2 * | 8/2012 | Ofri et al. ............... 73/504.13 |
| 2001/0042403 | A1 | 11/2001 | Watson |
| 2002/0017132 | A1 | 2/2002 | McNie et al. |
| 2005/0000285 | A1 | 1/2005 | Nishida et al. |
| 2005/0252292 | A1 | 11/2005 | Lo et al. |

FOREIGN PATENT DOCUMENTS

| | | |
|---|---|---|
| GB | 2 276 976 A | 10/1994 |
| GB | 2 322 196 A | 8/1998 |
| JP | 2006-064539 A | 3/2006 |
| JP | 2007-316037 A | 12/2007 |
| WO | WO 00/16041 | 3/2000 |
| WO | WO 01/20257 A2 | 3/2001 |
| WO | WO 2004/046650 | 6/2004 |
| WO | WO 2005/075939 | 8/2005 |
| WO | WO 2008/099395 * | 8/2008 |

OTHER PUBLICATIONS

Search Report dated Nov. 12, 2008, issued in the corresponding United Kingdom Patent Application No. 0812788.8.
Search Report dated Jan. 19, 2009, issued in the corresponding European Patent Application No. 08252388.7-1236.
International Search Report and the Written Opinion (Forms PCT/ISA/210 and PCT/ISA/237) dated Aug. 26, 2010, issued in the corresponding International Application No. PCT/GB2009/050824.
Japanese Office Action issued on Jun. 4, 2013 by the Japan Office Action in corresponding Japanese Patent Application No. 2011-517244, and English translation thereof.

* cited by examiner

Prior Art
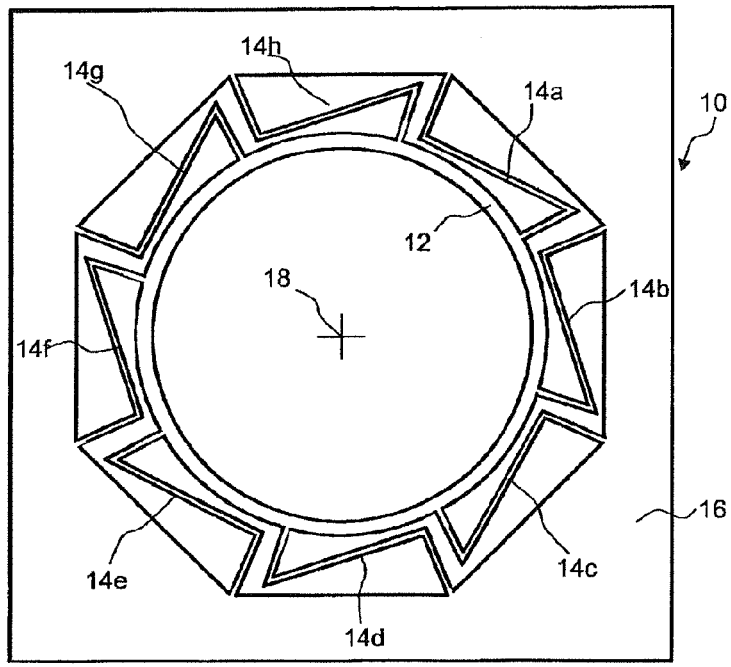
Fig. 1
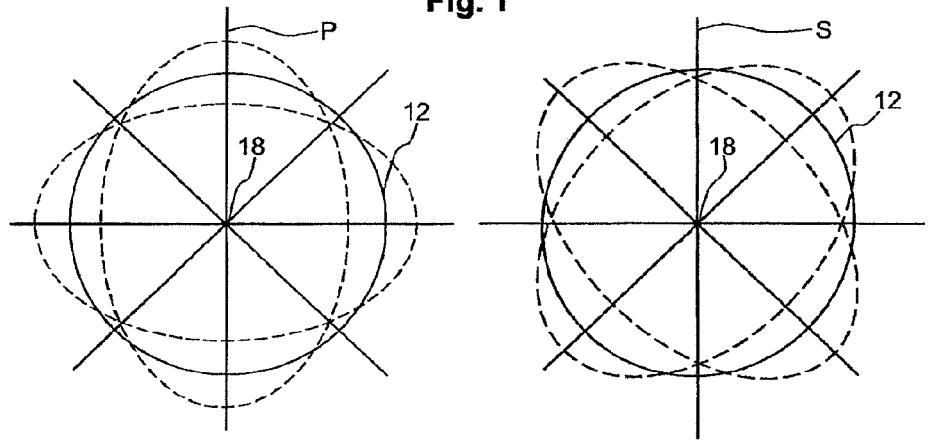
Prior Art
Fig. 2a
Prior Art
Fig. 2b

Prior Art

VIBRATING STRUCTURE GYROSCOPES

TECHNICAL FIELD

This invention relates to a vibrating structure gyroscope, which is particularly, but not exclusively, suitable for use as a Coriolis type gyroscope constructed using Micro-Electro-Mechanical Systems techniques.

BACKGROUND

Coriolis type gyroscopes, fabricated using Micro-Electro-Mechanical Systems (MEMS) technology, are now widely used for a range of high volume applications. For example, in the automotive industry such gyroscopes can be utilised in advanced braking systems, active suspension, rollover detection and prevention applications and navigation applications. The performance requirements of gyroscopes for such applications are relatively undemanding, particularly when compared to typical aerospace and military applications, where gyroscopes are used for guidance and control.

The suitability of MEMS gyroscopes for such applications is largely based on their low cost per unit, which is achieved primarily by the wafer level fabrication techniques of MEMS processing that enables MEMS gyroscopes to be economically produced in large quantities. The performance level of MEMS gyroscopes is relatively modest in comparison with other classes of gyroscope, such as spinning wheel or fibre optic gyroscopes. However, the use of higher specification gyroscopes is typically restricted to aerospace and military applications as the unit cost of such gyroscopes is too high to be considered for higher volume automotive and commercial applications. Conversely, the lower performance capability of MEMS gyroscopes prohibits their use in the majority of aerospace and military applications.

UK patent GB2322196 describes a MEMS gyroscope that is used for automotive and commercial applications. The low cost and rugged nature of this MEMS gyroscope makes it attractive for use in guidance and control, navigation and platform stabilisation applications. However, the performance capability, particularly in terms of the rate bias stability and signal to noise ratio, is typically insufficient to meet these requirements. It would therefore be advantageous to enhance the performance of such prior art apparatus.

Referring to FIG. 1, a known MEMS gyroscope 10, similar to that described in UK patent GB 2322196, includes a sensing element comprising a planar silicon ring structure 12 that is externally supported by eight compliant legs 14a to 14h. These legs 14a to 14h are in turn attached to a rigid external frame 16. The gyroscope 10 is arranged to operate using a cos 2θ vibration mode pair, as illustrated with referenced to FIGS. 2a and 2b. One of the vibration mode pair is excited as a primary carrier mode P, FIG. 2a wherein the dotted line indicates the extremes of motion of the ring structure 12 in the primary carrier mode P. When the ring structure 12 is rotated around an axis 18 normal to the plane of the ring structure 12 Coriolis forces are generated, which couple energy into a secondary response mode S, FIG. 2b wherein the dotted line indicates the extremes of motion of the ring structure 12 in the secondary response mode S. The amplitude of the induced motion is directly proportional to the applied rotation rate about the axis normal to the plane of the ring structure 12.

The primary carrier mode P is generated using at least one drive transducer and the secondary response mode S is detected using at least one pick-off transducer. The drive and pick-off transducers are arranged around the ring structure 12.

Referring to FIG. 3, in order to implement both drive and pick-off transducers, a metal track is provided on an upper surface of a ring structure 20 and an external frame 22, over an insulating surface oxide layer. Referring to FIG. 4, wherein in like references have been used to indicate similar integers to those described with reference to FIG. 3, metal track 24 is repeated for eight circuits, one circuit for each drive and pick-off transducer. Each circuit of metal track 24 begins at a first bond-pad 26, runs along a first compliant leg 28, across an eighth segment 30 of the ring structure 20 and back along an adjacent compliant leg 32 to a second bond-pad 34. This circuit arrangement is repeated for each eighth segment 30 of the ring structure 20, such that each compliant leg 28 carries a metal track 24 for two adjacent transducers.

A third metal track 36 is located along the centre of each compliant leg 28, 32, between the metal track 24 associated with adjacent transducers to reduce the cross-coupling effect between circuits associated with adjacent transducers.

A magnetic field B is applied around the periphery of the ring structure 20 and arranged perpendicular to the plane of the ring structure 20. The magnetic field is applied by a permanent magnet 38, located inside the circumference of the ring structure 20, and an upper pole piece 40 and lower pole piece 42 which are arranged to concentrate the magnetic field in a gap between the pole pieces 40, 42, in the vicinity of the periphery of the ring structure 20.

The ring structure 20, compliant legs 28, 32 and external frame 22 are bonded onto a supporting glass substrate 44. This assembly is in turn bonded onto a glass support structure 46 together with the permanent magnet 38 and pole pieces 40, 42, which are assembled with the ring structure 20 located in the gap between the upper and lower pole piece 40, 42.

In operation, passing an alternating current through a metal track 24 will generate a Lorentz force where the metal track 24 passes through the magnetic field. The magnitude of the force, $F_I$, will be given by:

$$F_I = BIL \qquad \text{Equation (1)}$$

where B is the magnetic field, I is the current and L is the length of metal track 24 in the magnetic field. If the frequency of the alternating current is at the resonance frequency of the primary carrier mode, the ring structure 20 will be excited into resonant vibratory motion. A metal track 24 arranged in this manner will define a drive transducer.

Where a metal track 24 is in motion within the magnetic field, a voltage, V, will be generated across the metal track 24, which is given by:

$$V = vBL \qquad \text{Equation (2)}$$

where v is the peak velocity of the vibratory motion of the metal track 24 in the magnetic field, B is the magnetic field and L is the length of metal track 24 in the magnetic field. A metal track 24 arranged in this manner will define a pick-off transducer.

Such a MEMS gyroscope 10 will typically be operated in a closed loop mode of operation. In this mode, the primary carrier mode P is driven at the resonance maximum using a primary drive transducer controlled by a Phase Locked Loop. The amplitude of motion of the ring structure 12 is maintained at a constant value by an Automatic Gain Control loop, which is arranged to compare the amplitude of motion of the ring structure 12, as measured at a primary pick-off transducer, to a fixed reference level and to dynamically adjust a drive signal to the primary drive transducer to maintain a constant signal level and hence a constant amplitude of motion of the ring structure 12. The magnitude of the Coriolis force induced when the ring structure 12 is rotated about the axis 18 normal to the plane of the ring structure 12, and hence the scale factor of the MEMS gyroscope 10 is directly proportional to the amplitude of the primary carrier mode P motion. The Coriolis force will induce motion in the secondary response mode S, which is detected by a secondary pick-off transducer. In the closed loop mode of operation, the secondary response mode S motion is nulled by an appropriately controlled secondary drive transducer. The drive force required to maintain the null condition of the secondary response mode S provides a direct representation of the rotation rate applied about the axis 18.

Generally, there are a number of possible sources of rate bias error for a MEMS gyroscope 10. The two most significant errors for a MEMS gyroscope 10 are known to be the quadrature bias error, which arises due to imperfections in the geometry of the ring structure 12, and the cross-coupling error, which arises due to direct coupling of the primary drive signal into the secondary pick-off signal detected in a rate channel.

In an ideal case, wherein the electronic circuits are suitably phased and there are identical carrier and response mode frequencies for the ring structure 12, there will be no motion detected at a secondary pick-off transducer when the MEMS gyroscope 12 is not subject to rotation about axis 18. However, in reality, small geometric imperfections of the ring structure 12, arising during the fabrication process, will give rise to a small splitting of the primary carrier P and secondary response S mode frequencies. This frequency split also tends to fix the angular position of the primary carrier P and the secondary response S modes at an arbitrary angle, $\alpha$, with respect to a primary drive transducer arranged at $\alpha=0°$. Accordingly, if the arbitrary angle is not zero, $\alpha \neq 0°$, a primary drive force applied by the primary drive transducer will excite both the primary carrier P and secondary response S modes to some extent. A phase locked loop circuit associated with the primary drive transducer will adjust the drive frequency to achieve a 90° phase shift between the primary carrier P and the secondary response S modes. However, motion will exist along the axis of the secondary response mode S that will be predominantly in quadrature phase with respect to the primary carrier mode P. In a closed loop system this motion will be nulled by a quadrature force component applied by the secondary drive transducer.

The quadrature drive level required to null the motion along the axis of the secondary response mode S is referred to as the quadrature bias, $\Omega_{QUAD}$, and is defined as:

$$\Omega_{QUAD} = K \times \Delta F \times \sin 4\alpha \qquad \text{Equation (3)}$$

where $\Delta F$ is the mode frequency split, $\alpha$ is the mode angle with respect to the primary drive axis and K is a constant including terms for the modal coupling coefficient and the secondary drive and primary pick-off gains.

Quadrature bias, $\Omega_{QUAD}$, can be large in comparison to the rate signals that the MEMS gyroscope is required to measure. A typical rate measurement range for a MEMS gyroscope 10 used in an automotive application is ±100°/sec. The quadrature bias, $\Omega_{QUAD}$, if scaled in degrees per second, can be large, for example greater than ±100°/sec, in comparison to the rate signal and can vary significantly over the operating temperature range of the MEMS gyroscope 10. Where a phase error, $\phi_E$, exists, a small proportion of this error signal will appear on the rate channel. This will give rise to a rate bias error, $\Omega_{Err}$, which is given by:

$$\Omega_{Err} = K \times \Delta F \times \sin 4\alpha \times \sin \phi_E \qquad \text{Equation (4)}$$

Even a relatively small phase error, $\phi_E$, can give rise to a significant rate bias error, $\Omega_{Err}$. Any variation in the quadrature signal or the phase error, $\phi_E$, with temperature will cause the quadrature bias, $\Omega_{QUAD}$, to vary which will severely limit the accuracy and stability of the MEMS gyroscope 10. The phase error, $\phi_E$, will typically be relatively stable over the operating temperature range of the MEMS gyroscope 10. However, the quadrature bias, $\Omega_{QUAD}$, will typically vary by a significant amount. This large variation results in a correspondingly large variation in the quadrature bias error and hence an instability in the rate bias performance.

The dominant contribution to the cross-coupling of the primary drive signal into the secondary pick-off, and hence the rate channel, arises due to the close proximity of the metal tracks 24 associated with adjacent transducers, which run parallel to one another along a single compliant leg 28, 32. A third metal track 36 connected to ground is arranged between the two parallel metal tracks 24 to minimise the direct capacitive coupling between the metal tracks 24. However, a significant electrical coupling still exists between the two metal tracks 24. The magnitude of the cross-coupling bias error, $\Omega_C$, arising from this coupling is defined as:

$$\Omega_C = \frac{K \times F \times \phi_C}{Q^2} \qquad \text{Equation (5)}$$

where $\phi_C$ is the coupling coefficient, F is the resonance frequency, and Q is the Quality Factor of the resonance mode. This mechanism is known to contribute to rate bias, for example between 1 and 2 degrees per second of rate bias at ambient temperature. This value will scale as $1/Q^2$ and the Quality Factor, Q, will vary by a significant amount, i.e. ±50%, over the operating temperature range of the MEMS gyroscope 10. Therefore, this mechanism makes a significant contribution to the rate bias variation over temperature, which, due to its non-linear nature, is difficult to compensate.

GB2322196A discloses a vibrating structure gyroscope with eight compliant legs supporting a resonator and carrying electromagnetic drive means and sensors. The actuator and sensor tracks are on a common leg and are isolated from each other by intermediate tracks. This feature tends to increase the width of the legs.

WO0120257A discloses a vibrating structure gyroscope with eight compliant legs supporting a resonator and piezoelectric actuators and sensors. In one embodiment however, magnetic transducers are employed with pairs of legs carrying the transducer conductors and straddling nodes of the resonator. However the legs are not symmetric.

GB 2276976A discloses A vibrating structure gyroscope, including:
- a substantially planar annular resonator;
- a substrate;
- at least one drive transducer arranged to cause the annular resonator to oscillate in a primary in-plane mode at the resonant frequency of the primary mode and having an associated flexible support including first and second leg members which have a radially-extending line of symmetry (LS) between them;
- a support arrangement including a plurality of flexible supports arranged to support the annular resonator from the substrate and to allow the annular resonator to oscillate in the primary in-plane mode and to oscillate in a secondary in-plane mode in response to an angular velocity applied around an axis substantially perpendicular to the plane of the annular resonator, and
- at least one pick-off transducer arranged to detect oscillation of the annular resonator in the secondary in-plane mode and having an associated flexible support including first and second leg members which have a radially-extending line of symmetry between them;

wherein a magnetic field is arranged perpendicular to the plane of the annular resonator such that the drive transducers are located within the magnetic field, wherein said at least one drive transducer includes a metal track on the annular resonator and on the flexible supports, and has a continuous metal track comprising a first track section running from the substrate along the first leg member, along a section of the annular resonator and along the second leg member back to the substrate, said first and second leg members only carrying the metal track associated with a single drive transducer,

SUMMARY

The present invention provides a vibrating structure gyroscope as in the above summary of GB 2276976A, characterised in that said at least one pick-off transducer is located in said magnetic field and has a continuous metal track comprising a first track section running from the substrate along the first leg member, along a section of the annular resonator and along the second leg member back to the substrate, said first and second leg members only carrying the metal track associated with a single pick-off transducer.

The above magnetic pick-off transducer has the advantage over the capacitive transducer utilised in GB 2276976A that the symmetry of the legs can be improved, since each leg can carry a conductor track whereas in GB '976A, of the pairs legs forming a capacitive pick-off transducer, only one carries a conductor track.

Preferably the continuous metal track further comprises at least a second track section continuing from the substrate along the first leg member, along a section of the annular resonator and along the second leg member back to the substrate, said track sections being connected in series and laterally spaced apart from each other.

This feature enhances the driving oscillation and the pick-off sensitivity and hence increases the signal-to-noise ratio.

Preferably each leg member includes a first radial section extending inwardly from said substrate, a circumferential section, and a second radial section arranged such that the first radial section and second radial section are connected to one another via the circumferential section, and the second radial section is connected to the external periphery of the annular resonator with said circumferential section located outside said magnetic field.

This leg configuration is highly compliant and ensures that the current flowing through the circumferential section does not interfere with the motor or generator action of the current flowing through the track which runs along the section of the annular resonator. Furthermore the first radial sections, located outside the magnetic field, similarly do not cause any interference with the in-plane radial oscillation of the annular resonator and the effects of currents flowing in both the first and second radial sections, being antiparallel, tend to cancel each other.

Preferably said second radial sections of the respective leg members are spaced apart with a spacing greater than the length of the second radial sections.

This feature tends to maximise the length of the track portion which runs along the section of the annular resonator and which generates the desired motor action (in a drive transducer) or signal (in a pick-off transducer) in relation to the length of the radial sections and their associated conductor tracks, which do not.

Preferably said first radial sections of said respective leg members are spaced apart with a spacing which is less than the length of said first radial sections.

This feature tends to maximise the inductive cancellation of the currents running along the first radial sections.

The flexible supports are preferably equiangularly spaced about the annular resonator.

In a preferred embodiment at least one primary drive transducer is arranged to cause the annular resonator to oscillate in a primary mode at the resonant frequency of the primary mode, at least one primary pick-off transducer is arranged to detect oscillation of the annular resonator in the primary mode and to maintain the annular resonator at the resonant frequency of the primary mode, at least one secondary pick-off transducer is arranged to detect oscillation of a secondary mode induced when angular velocity is applied around the axis substantially perpendicular to the annular resonator and at least one secondary drive transducer is arranged to null the induced secondary mode oscillation.

The annular resonator, substrate and support arrangement may be arranged substantially in the same plane as one another. The drive and pick-off transducers may be arranged substantially coplanar with one another and with the substrate.

The leg members may optionally be supported at one end from a central hub of the substrate located internally of the annular resonator and each leg member connected at the other end to the internal periphery of the annular resonator. Alternatively, each leg member may be supported at one end from the substrate externally of the annular resonator and each leg member connected at the other end to the external periphery of the annular resonator.

The substrate may be sealed to form a sealed cavity encapsulating the annular resonator, the support arrangement and the drive and pick-off transducers.

The support arrangement, annular resonator and substrate may be formed from silicon and an insulating layer may be arranged between metal tracks and the support arrangement, annular resonator and substrate.

BRIEF DESCRIPTION OF THE DRAWINGS

Preferred embodiments of the invention will now be described, by way of example only, with reference to the accompanying drawings, in which:

FIG. 1 illustrates, in schematic plan view, a MEMS gyroscope according to the prior art;

FIG. 2a schematically illustrates a ring structure according to the prior art and the action of radial displacement of a primary carrier mode P;

FIG. 2b schematically illustrates a ring structure according to the prior art and the action of radial displacement of a secondary response mode S;

DETAILED DESCRIPTION

Figure 3:
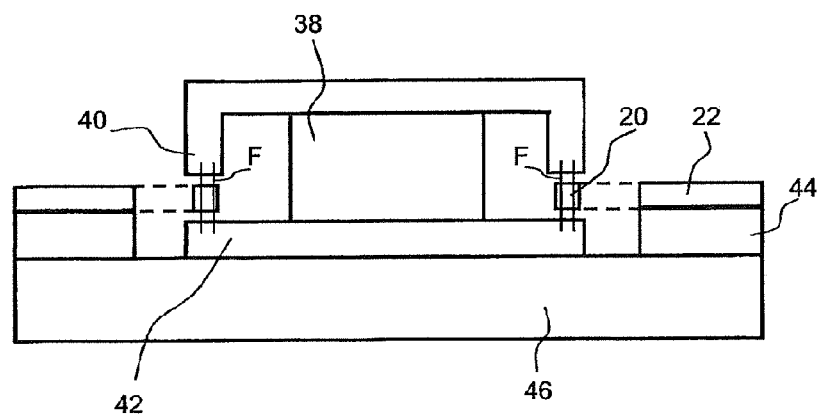
FIG. 3 illustrates, in elevation sectional view, a MEMS gyroscope according to the prior art.
Figure 4:
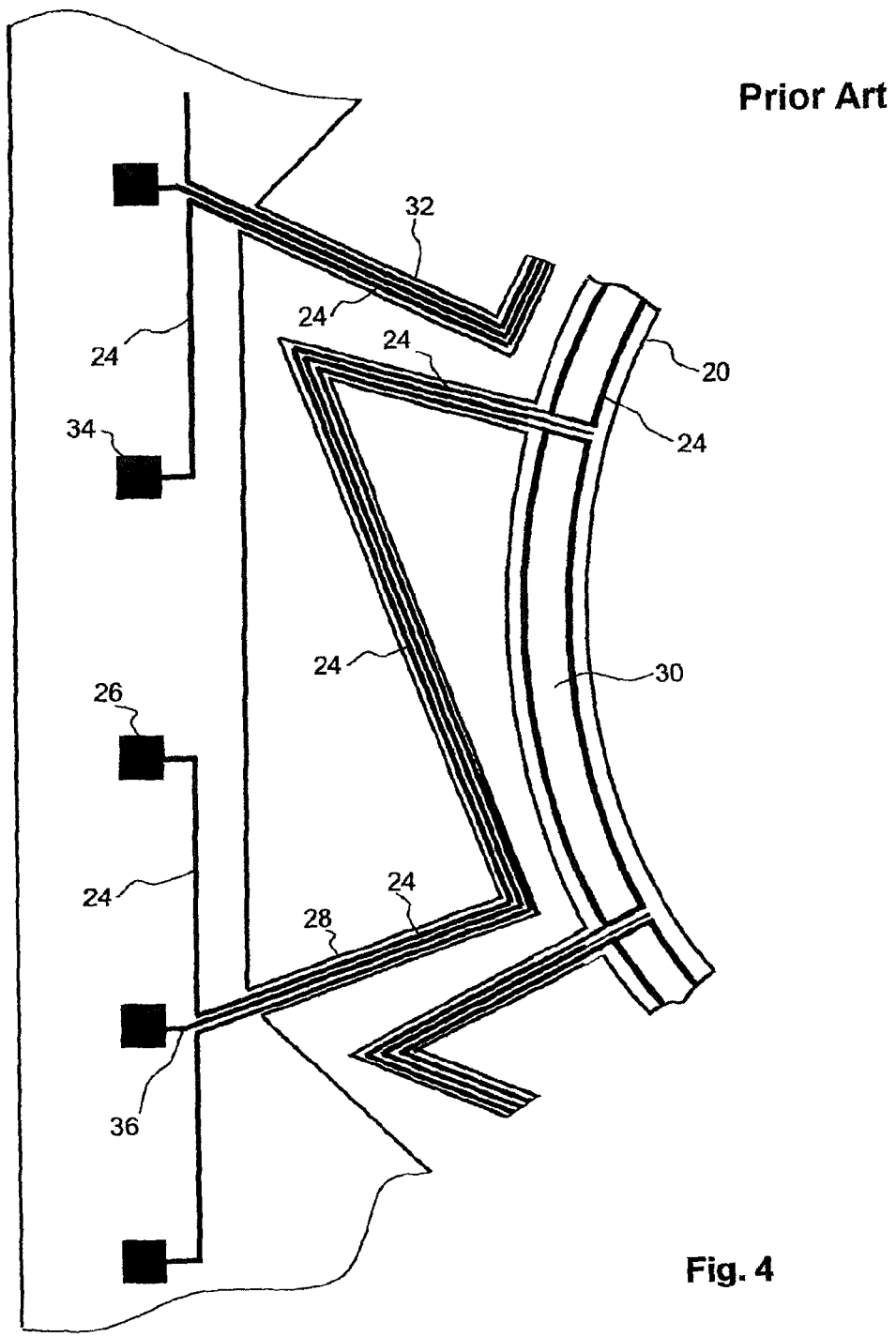
FIG. 4 illustrates, in partial plan view, a metal track arrangement according to the prior art.

The inventor has appreciated that the variation in the quadrature bias for the prior art MEMS gyroscope 10 described with reference to FIGS. 1 to 4, is caused by variation in the frequency split of the primary carrier P and secondary response S mode frequencies and the position of the secondary response mode S over temperature. The differential expansion between the silicon of the external frame 22 and the glass support structure 46 tends to distort the external frame 22. This in turn distorts the compliant legs 14a to 14h in such a way that the primary carrier P and secondary response S modes are differentially perturbed thus affecting their frequencies and mode alignment with respect to the ring structure or annular resonator 12.

Figure 5:
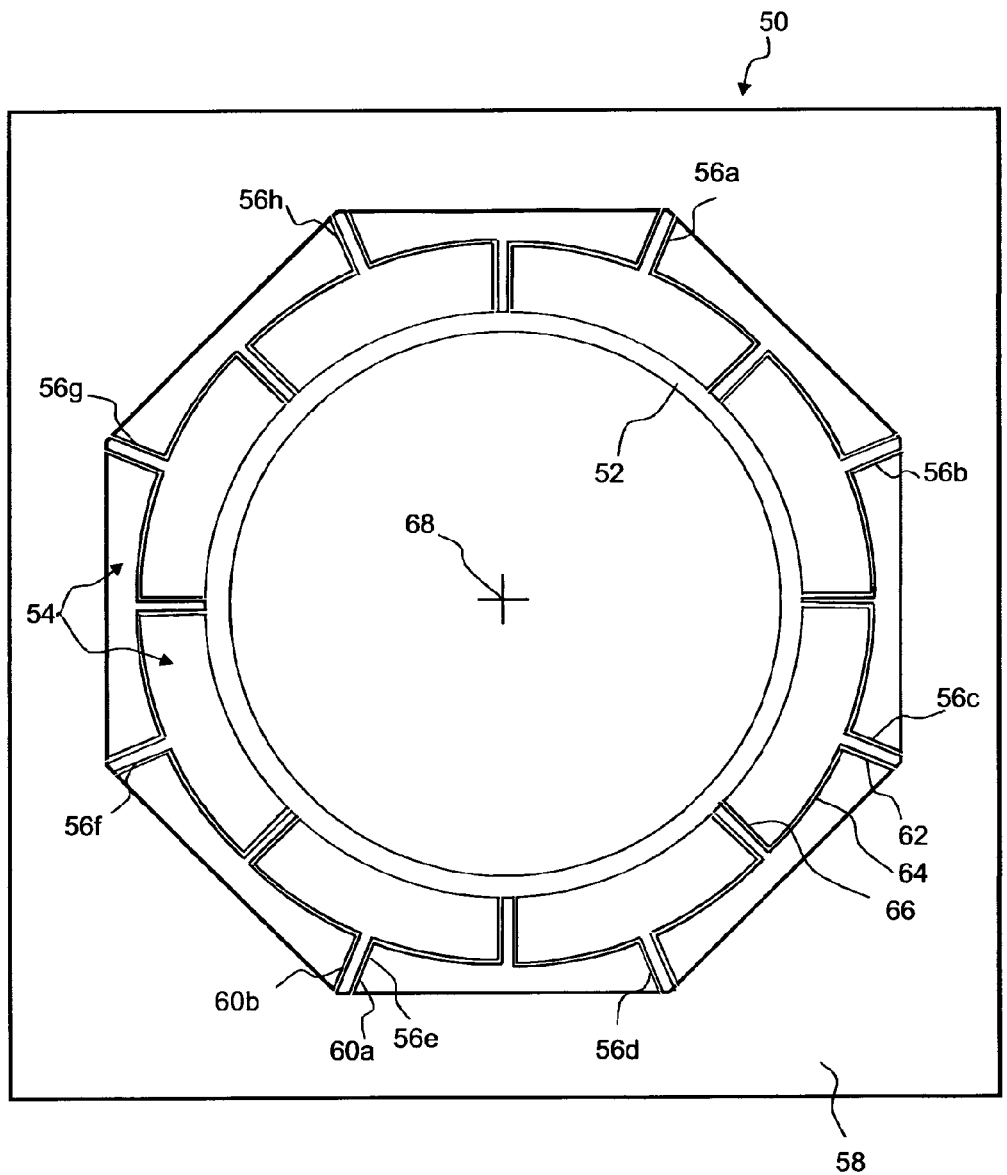
FIG. 5 illustrates, in plan view, a vibrating structure gyroscope according to the present invention.

Referring to FIG. 5, a vibrating structure gyroscope 50, includes a planar silicon ring structure 52 that is externally supported by a support arrangement 54 having eight flexible supports 56a to 56h arranged to retain the ring structure within a substrate defining a rigid external frame 58. Each flexible support 56a to 56h includes a pair of compliant legs 60a and 60b that are attached at one end to the external periphery of the ring structure 52 and at the other end to the internal periphery of the external frame 58. In this example, the compliant legs 60a and 60b are symmetrical to one another and each compliant leg 60a, 60b includes a first radial section 62, an arcuate section 64 and a second radial section 66 arranged such that the first radial section 62 and second radial section 66 are connected to one another via the arcuate section 64, the first radial section 62 is connected to the internal periphery of the external frame 58 and the second radial section 66 is connected to the external periphery of the ring structure 52.

The first and second radial sections provide compliance in the tangential direction (to ensure sensitivity to rotation about axis 68) and arcuate section 64 provides compliance in the radial direction. The close spacing (preferably less than half their length) of the first radial sections 62 ensures that the inductive effects of currents through their associated metal track portions (shown in FIG. 7) are cancelled.

It will be understood that the ring structure 52, external frame 58 and support arrangement 54 can all be formed from a single substrate of silicon material using MEMS manufacturing techniques.

In this manner, the effect of distortion of the compliant legs 60a and 60b and its consequential effect on the alignment of the frequencies of the primary carrier and secondary response modes with respect to the ring structure 52 is reduced as the in-plane stiffness of the compliant legs 60a and 60b is reduced, thus isolating the ring structure 52 to a greater degree from external stress and strain. This is achieved by reducing the width of the compliant legs 60a and 60b. However, the use of a pair of compliant legs 60a and 60b will maintain the out of plane stiffness provided by the compliant legs 60a and 60b. The maintenance of a high out of plane stiffness is advantageous as this limits the motion of the ring structure 52 in response to shock and vibration inputs applied along an axis 68 normal to the plane of the ring structure 52. This is beneficial as it reduces the sensitivity of the vibrating structure gyroscope 50 to externally applied mechanical disturbances.

Accordingly, the support arrangement 54 illustrated in FIG. 5 has eight flexible supports 56a to 56h equiangularly spaced about the ring structure 52, each flexible support 56a, 56h having two compliant legs 60a, 60b, arranged as symmetric pairs with a combined in-plane stiffness that is significantly reduced compared to that described with reference to FIGS. 1 to 4. This provides enhanced isolation from thermally induced stress and strain and maintains the out of plane stiffness required to minimise sensitivity to shock and vibration. The in-plane stiffness of an individual compliant leg 60a, 60b will vary approximately in proportion to the width of the compliant leg 60a, 60b cubed. Conversely, the out of plane stiffness varies linearly with the width of the compliant leg 60a, 60b. Accordingly, reducing the width of the compliant leg 60a, 60b reduces the in-plane stiffness. For example, the width of the compliant legs 14a to 14h for the device described in UK patent GB2322196 is nominally 60 micrometers compared to a width of 20 micrometers for the compliant legs 60a, 60b of the FIG. 5 arrangement. The combined stiffness of the support arrangement 54 in response to in-plane displacement has been reduced by approximately a factor of four compared to the device described in UK patent GB2322196. In contrast, the relative stiffness in response to out of plane displacement of the support arrangement 54 according to the present arrangement is only slightly reduced when compared to the device of UK patent GB2322196, by approximately 25%.

Figure 10:
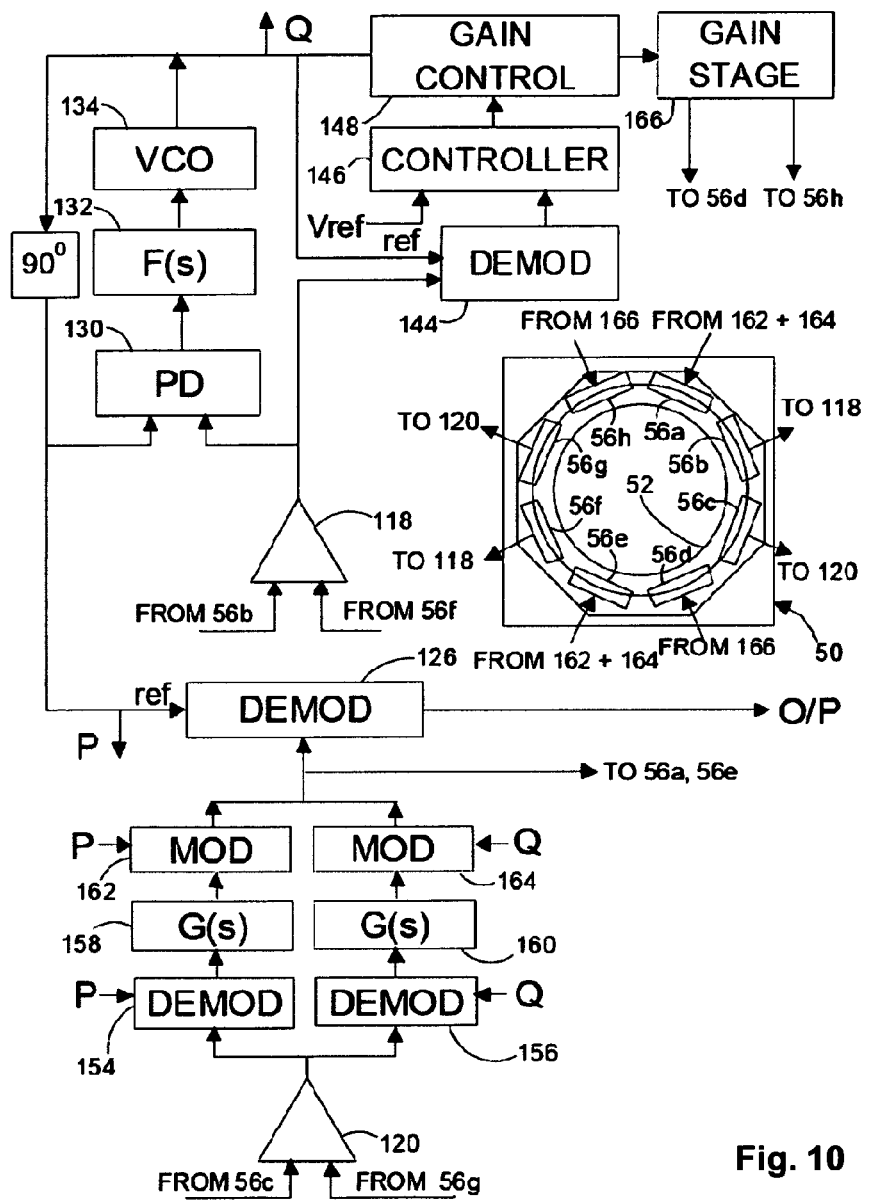
FIG. 10 is a block diagram illustrating the electronic signal processing arrangement of the embodiments of FIGS. 5, 7 and 8.

Referring to FIG. 10, the primary loop comprises a pair of inductive pick off transducers (constituted by the metal track sections shown in FIG. 7 or FIG. 8) on legs 56b and 56f respectively. These are connected via an amplifier 118 to a demodulator 144 for automatic gain control and a phase detector PD (130) to set the frequency of oscillation of the ring by means of a VCO (voltage controlled oscillator) 134 after a loop filter F(s) (132). A 90 degree phase shift is used for the reference for the phase detector 130. After passing through the gain control 148 and a gain stage 166, drive signals applied to primary drive transducers (constituted by the metal track sections shown in FIG. 7 or FIG. 8 on legs 56d and 56h respectively) set the ring 52 into primary motion.

The P phase is at 90 degrees with respect to the primary drive and is in phase with the primary pick off. The Q phase is in phase with the primary drive and 90 degrees out of phase with the primary pick off signal.

Signals from secondary inductive pick off transducers (constituted by the metal tracks on legs 56c and 56g respectively), at 45 degrees with respect to the primary, are amplified in an amplifier 120 and go via two demodulators 154 (in phase P) and 156 (quadrature phase Q) to loop filters G(s) 158 and 160 and thence to in phase and quadrature remodulators 162 and 164 respectively. These two signals are then joined to form the secondary drive going to drive transducers constituted by the metal tracks on legs 56a and 56e respectively.

The output rate signal from demodulator 126 uses the in-phase signal P component of the secondary drive.

In use, the secondary drive transducers are arranged to null the secondary mode oscillation (S) induced when angular velocity is applied about the sensitive axis 68.

Figure 6:
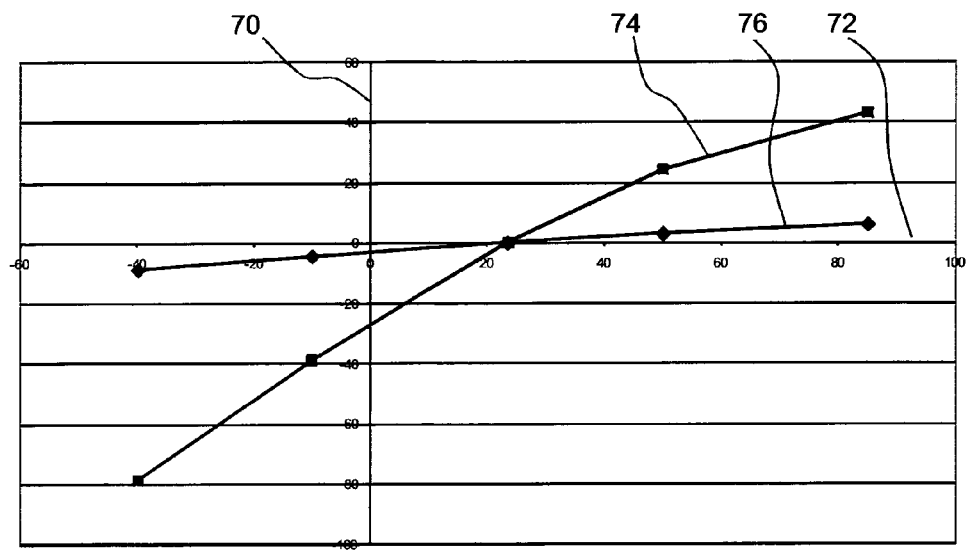
FIG. 6 illustrates, in graph form, a comparison of quadrature bias as a function of operating temperature of a MEMS gyroscope according to the prior art and a vibrating structure gyroscope according to the present invention.

Referring to FIG. 6, the beneficial effect of enhanced in-plane mechanical isolation of the ring structure 52 to thermally induced strains can be appreciated from a comparison the quadrature bias in degrees per second, indicated along the ordinate 70, against temperature in degrees Celsius indicated along the abscissa 72, of the device of UK patent GB2322196, indicated as line 74, and the vibrating structure gyroscope 50 according to the present invention, indicated as line 76. Line 74 illustrates a greater variation over temperature compared to the line 76. For example, the quadrature bias temperature stability of the present invention can exhibit an eight fold improvement over the prior art device of UK patent GB2322196.

In the FIG. 5 arrangement, a primary carrier mode is generated using at least one drive transducer and a secondary response mode is detected using at least one pick-off transducer. The drive and pick-off transducers are arranged around the ring structure 52, in this case, there are eight transducers equiangularly spaced around the ring structure 52. Four drive transducers, one pair of transducers arranged to provide a primary drive to the ring structure 52 and one pair of transducers arranged to provide a secondary drive to the ring structure and four pick-off transducers, one pair of transducers arranged to provide a primary pick-off signal and one pair of transducers arranged to provide a secondary pick-off signal.

Figure 7:
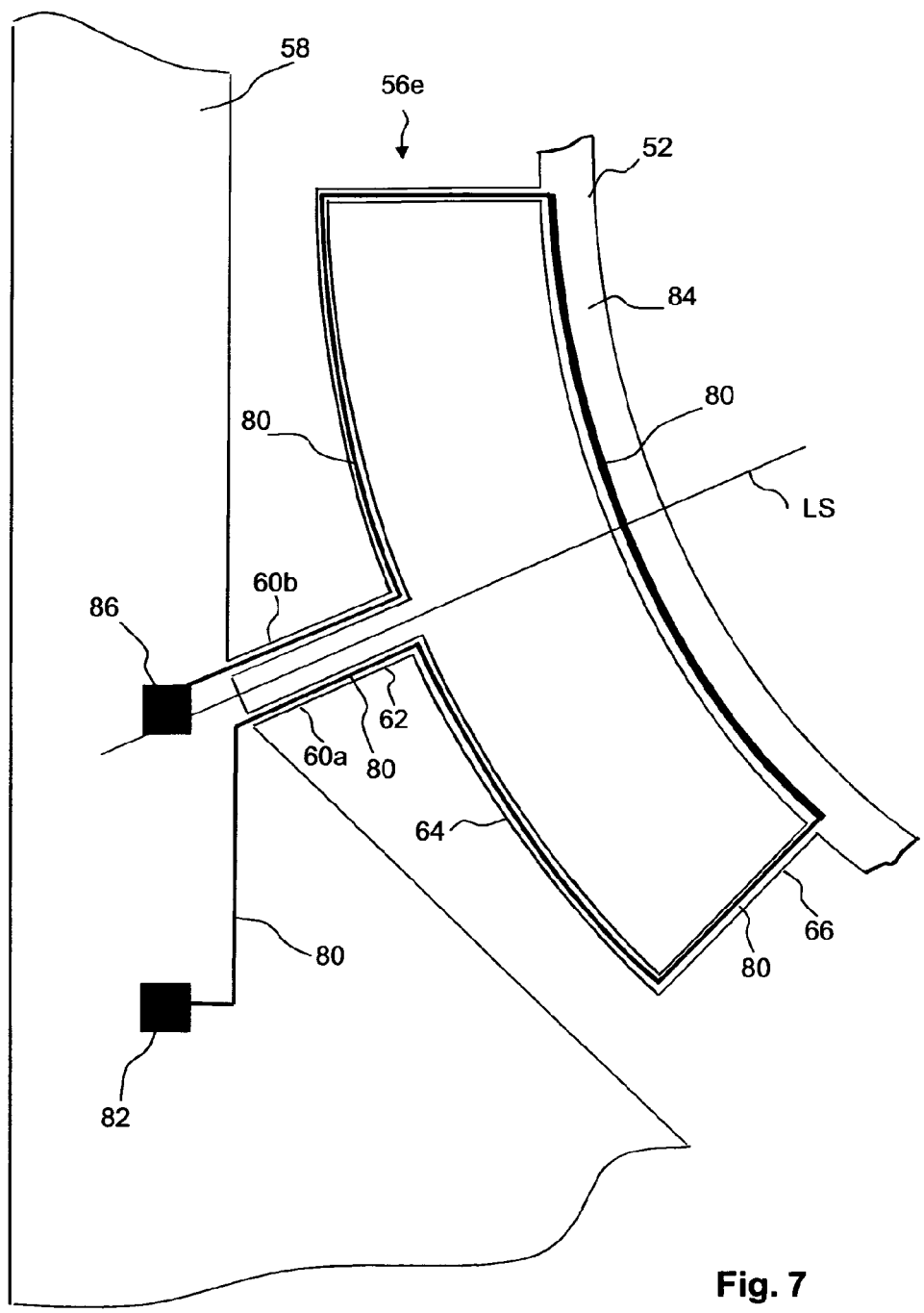
FIG. 7 illustrates, in partial plan view, a metal track arrangement according to the present invention.

Referring to FIG. 7, wherein like references have been used to indicate similar integers to those described with reference to FIG. 5, in order to implement both drive and pick-off transducers, a metal track 80 is provided on an upper surface of the ring structure 52, the external frame 58 and each compliant leg 60a, 60b over an insulating surface oxide layer, not illustrated. The metal track 80 is repeated for eight circuits, one circuit for each drive and pick-off transducer. FIG. 7 illustrates the metal track 80 associated with flexible support 56e of FIG. 5. Each circuit of metal track 80 begins at a first bond-pad 82 on the external frame 58, runs along a first compliant leg 60a, across an eighth segment 84 of the ring structure 52 and back along the other compliant leg 60b to a second bond-pad 86 on the external frame 58. This circuit arrangement is repeated for each eighth segment 84 of the ring structure 52, such that each pair of compliant legs 60a and 60b only carries the metal track 80 associated with a single transducer.

Accordingly, as was the case in the prior art, a separate third metal track 36 connected to ground is not required to minimise cross-coupling between metal tracks 24 running parallel to one another, wherein each metal track 24 is associated with a different drive or pick-off transducer. This is of particular importance where the metal track 24 associated with a primary drive transducer runs parallel to the metal track 24 associated with a secondary pick-off transducer along the same compliant leg 28 or 32.

Routing the metal track 80 associated with different transducers along separate compliant legs 60a, 60b provides a reduction in the cross-coupling, $\eta_C$, and hence in the cross-coupling bias error, $\wedge_C$, thus improving the overall rate bias temperature stability of the vibrating structure gyroscope 50.

The compliant legs are symmetrically disposed about a line of symmetry LS and the portions of the metal track running from the respective compliant legs onto the ring structure 52 diverge from said line of symmetry to form a loop which is also substantially symmetrically disposed about said line of symmetry. This feature minimises disturbing motor forces acting on the compliant legs and maximises the gain of the transducer.

As with the prior art, a magnetic field is applied around the periphery of the ring structure 52, oriented perpendicular to the plane of the ring structure 52. The magnetic field is applied by a permanent magnet, located inside the circumference of the ring structure 52, and an upper pole piece and lower pole piece which are arranged to concentrate the magnetic field in a gap between the pole pieces in the vicinity of the periphery of the ring structure 52.

The ring structure 52, compliant legs 60a, 60b and external frame 58 are bonded onto a supporting glass substrate. This assembly is in turn bonded onto a glass support structure together with the permanent magnet and pole pieces, which are assembled with the ring structure 52 located in the gap between the upper and lower pole piece.

As previously described, passing an alternating current through the metal track 80 will generate a Lorentz force where the metal track 80 passes through the magnetic field. If the frequency of the alternating current is at the resonance frequency of the primary carrier mode, the ring structure 52 will be excited into resonant vibratory motion. A metal track 80 arranged in this manner will define a drive transducer.

Where a metal track 80 is in motion within the magnetic field, a voltage will be generated across the metal track 80. A metal track 80 arranged in this manner will define a pick-off transducer.

Such a MEMS gyroscope 52 will typically be operated in a closed loop mode of operation. In this mode, the primary carrier mode is driven at the resonance maximum using a primary drive transducer controlled by a Phase Locked Loop. The amplitude of motion of the ring structure 52 is maintained at a constant value by an Automatic Gain Control loop, which is arranged to compare the amplitude of motion of the ring structure 52, as measured at the primary pick-off transducer, to a fixed reference level and to dynamically adjust a drive signal to a primary drive transducer to maintain a constant signal level and hence a constant amplitude of motion of the ring structure 52. The magnitude of the Coriolis force induced when the ring structure 52 is rotated about the axis 68 normal to the plane of the ring structure 52, and hence the scalefactor of the MEMS gyroscope 50 is directly proportional to the amplitude of the primary carrier mode motion. The Coriolis force will induce motion in the secondary response mode, which is detected by a secondary pick-off transducer. In the closed loop mode of operation, the secondary response mode motion is nulled by an appropriately controlled secondary drive transducer. The drive force required to maintain the null condition of the secondary response mode provides a direct representation of the rotation rate applied about the axis 68.

Figure 8:
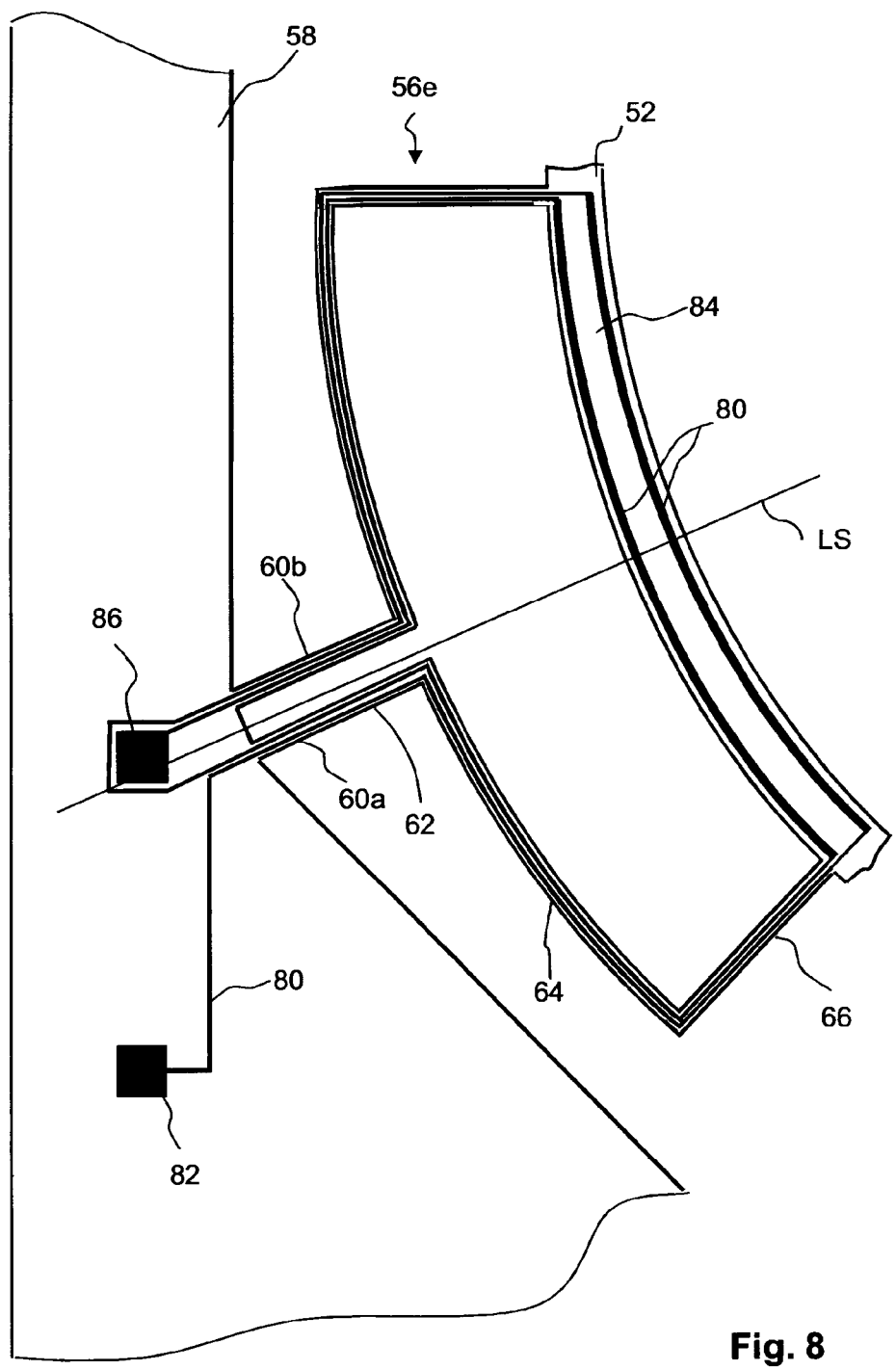
FIG. 8 illustrates, in partial plan view, an alternative metal track arrangement according to the present invention.

Referring to FIG. 8, wherein like references have been used to indicate similar integers to those described with reference to FIGS. 5 and 7, a further advantage of the support arrangement 54 of the present invention is that there is sufficient area on each compliant leg 60a, 60b to fabricate a two turn metal track 80 circuit, that is a pair of laterally spaced parallel metal tracks 80, around one or more of the flexible supports 56a to 56h. In order to implement such a drive or pick-off transducer, a metal track 80 is provided on an upper surface of a ring structure 52, the external frame 58 and each compliant leg 60a, 60b over an insulating surface oxide layer, not illustrated. FIG. 8 illustrates the metal track 80 associated with flexible support 56e of FIG. 5. Each circuit begins at the first bond-pad 82 on the external frame 58, runs along the first compliant leg 60a, across the eighth segment 84 of the ring structure 52 and back along the other compliant leg 60b, around the second bond-pad 86 on the external frame 58, back along the first compliant leg 60a, across the eighth segment 84 of the ring structure 52, along the other compliant leg 60b to the second bond-pad 86 on the external frame 58. It will be noted that the metal track 80 is arranged in a laterally spaced and parallel relation for each route about the complaint legs 60a, 60b and the eighth segment 84 of the ring structure 52. This circuit arrangement can be repeated for each eighth segment 84 of the ring structure 52, such that each pair of compliant legs 60a and 60b only carries the metal track 80 associated with a single transducer.

This effectively doubles the length of the metal track 80 within the magnetic field applied to the ring structure 52.

Accordingly, the gain of each drive and pick-off transducer is thereby also doubled. Such an arrangement would not be practical for the prior art apparatus due to the limitations on the geometry of the metal track 24 as imposed by the fabrication process. These limitations require a minimum separation between adjacent metal tracks 24 of more than five microns and a similar separation between the edge of the metal track 24 and the edge of the complaint leg 28, 32 to ensure reliable electrical isolation of adjacent metal tracks 24.

Doubling the length of metal track 80 in the magnetic field, i.e. increasing length L component in Equation 1 above, will increase the drive gain applied by a drive transducer by a factor of two. This enables the drive current required to achieve a given primary carrier mode amplitude to be reduced. The amount of drive coupling into the rate channel, and hence the cross-coupling bias, $\wedge_C$, will also be further reduced, which will benefit to the rate bias temperature stability.

Furthermore, doubling the length of the metal track 80 in the magnetic field, i.e. increasing the L component in Equation 2, will also increase the signal provided at a pick-off transducer by a factor of two, for a given amplitude of motion. For such a vibrating structure gyroscope 50, operating in a closed loop mode, the noise level is dominated by the voltage noise of a secondary pick-off amplifier. Accordingly, doubling the pick-off transducer signal level will provide a two fold improvement in the rate equivalent signal to noise ratio of the vibrating structure gyroscope 50. Again, this provides additional performance enhancement for the vibrating structure gyroscope 50.

Figure 9:
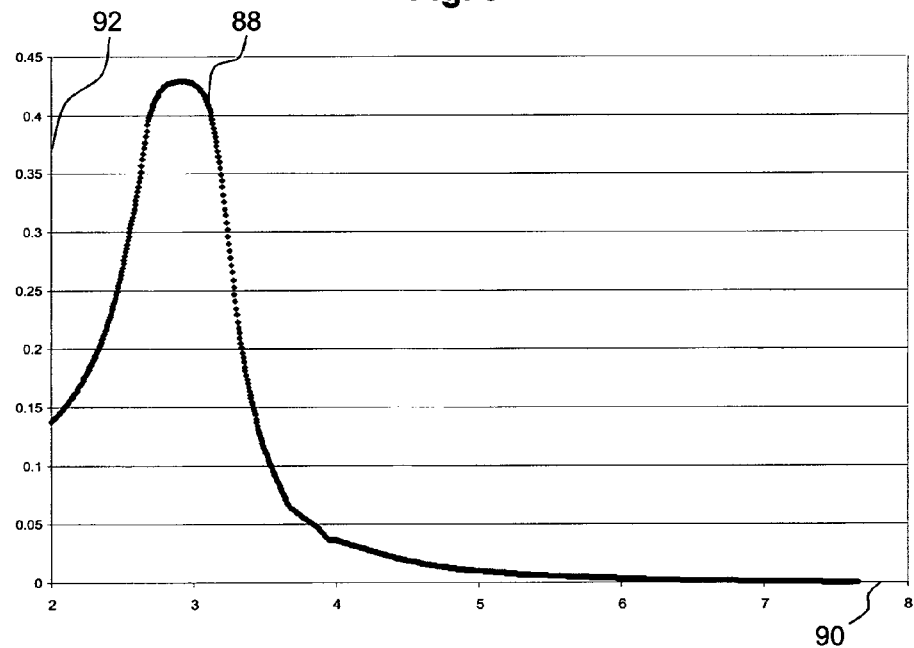
FIG. 9 illustrate, in graph form, radial variation in the vertical component of a magnetic field in an embodiment of the present invention.

The preferred embodiment of the present invention has an additional advantage over the prior art MEMS gyroscope 10. In the MEMS gyroscope 10 described in UK patent GB2322196, a significant proportion of each compliant leg 14*a* to 14*h* is in close proximity to the ring structure 12 and hence to the region where the magnetic field intensity is at a maximum. Referring to FIG. 9, the radial variation of the vertical component of the magnetic field, through the centre of the ring structure 12 and compliant legs 14*a* to 14*h*, is indicated as line 88. The radius of the magnetic field in millimeters (mm) is indicated along the abscissa and the vertical component of the magnetic field in milliTeslas (mT) is indicated along the ordinate. As will be observed, the magnetic field increases from the edge of the magnet, 2 mm radius, and is at a maximum in the region of the gap, 3 mm radius. The magnetic field reduces with increasing radius, greater than 3 mm, but is still around ten percent of the peak value at a radius of 4 mm. Accordingly, for the MEMS gyroscope of UK patent GB2322196, a significant portion of each complaint leg 14*a* to 14*h* is located in a region of high magnetic field. When current is passed through the compliant legs 14*a* to 14*h*, significant forces will be generated in the plane of the ring structure 12, perpendicular to the path of the current flow. These forces are undesirable as they will excite motion of the ring structure 12 by exerting a force at the point of attachment of a compliant leg 14*a* to 14*h*. These forces are not aligned to the forces generated on the ring structure 12 and tend to rotate the net resultant drive force applied by a drive transducer away from the desired alignment. These forces also tend to oppose the drive force applied by a drive transducer to the ring structure 12 resulting in a reduction of the drive efficiency. The motion of the compliant legs 14*a* to 14*h* supporting metal tracks 24 associated with pick-off transducers is also problematic, as this will induce signals that interfere with the desired signals generated by the motion of the ring structure 12 and thus degrade the accuracy of the MEMS gyroscope 10.

In the present invention, the symmetric pairs of compliant legs 60*a*, 60*b* are arranged such that the second radial sections 66 provide a greater separation for the first radial section 62 and arcuate section 64 from the gap of the magnetic field. Therefore, the amount of compliant leg 60*a*, 60*b* within the region of the magnetic field is reduced thus reducing the magnitude of the forces generated and the level of spurious signals induced in the metal track 80 associated with a pickoff transducer. The symmetric structure of the complaint legs 60*a*, 60*b* also ensures that the forces and signals generated on each complaint leg 60*a*, 60*b* of a given flexible support 56*a* to 56*h* will be substantially equal and opposite. Accordingly, such undesirable forces and signals will substantially cancel.

Accordingly, the improved support arrangement 54 facilitates improvements to the quadrature bias temperature stability and hence the overall rate bias performance of the vibrating structure gyroscope 50. The improved support arrangement 54 further enables a metal track 80 circuit layout that reduces cross-coupling between the metal tracks 80 associated with drive and pick-off transducers, thereby enabling a further improvement to the rate bias temperature stability of the vibrating structure gyroscope 50. The improved support arrangement 54 can be implemented without substantial changes in the fabrication or assembly processes of the vibrating structure gyroscope 50, using the same permanent magnet, upper and lower pole pieces. The resulting vibrating structure gyroscope 50 can also incorporate the same control electronics, thus enabling improved quadrature bias temperature stability without an increase in unit cost of the vibrating structure gyroscope 50.

It will be understood that other configurations of the flexible supports are possible. For example, the eight flexible supports can be arranged internally within the ring structure such that compliant legs are attached at one end to the internal periphery of the ring structure and at the other from a central hub of the substrate located internally of the ring structure. In this embodiment, bond-on pads will be provided on the hub and the metal track is located on the hub, the compliant legs and the ring structure. The arrangement of the compliant legs and the track is otherwise similar to that described with reference to FIGS. 5 to 9.

Furthermore, the substrate that defines the external frame 58 can be sealed to form a sealed cavity encapsulating the ring structure 52, the flexible supports 56*a* to 56*h* and associated metal track 80, thereby inhibiting ingress of unwanted material within the sealed cavity.

The invention claimed is:

1. A vibrating structure gyroscope, including:
   a substantially planar annular resonator;
   a substrate;
   at least one drive transducer arranged to cause the annular resonator to oscillate in a primary in-plane mode at a resonant frequency of the primary mode and having an associated flexible support including first and second leg members which have a radially-extending line of symmetry between them;
   a support arrangement including a plurality of flexible supports arranged to support the annular resonator from the substrate and to allow the annular resonator to oscillate in the primary in-plane mode and to oscillate in a secondary in-plane mode in response to an angular velocity applied around an axis substantially perpendicular to a plane of the annular resonator; and
   at least one pick-off transducer arranged to detect oscillation of the annular resonator in the secondary in-plane mode and having an associated flexible support including first and second leg members which have a radially-extending line of symmetry between them;

wherein a magnetic field is arranged perpendicular to the plane of the annular resonator such that each drive transducer is located within the magnetic field;

wherein said at least one drive transducer includes a metal track on the annular resonator and on the flexible supports, and has a continuous metal track comprising a first track section running from the substrate along the first leg member, along a section of the annular resonator and along the second leg member back to the substrate, said first and second leg members only carrying the metal track associated with a single drive transducer, wherein said at least one pick-off transducer is located in said magnetic field and has a continuous metal track comprising a first track section running from the substrate along the first leg member, along a section of the annular resonator and along the second leg member back to the substrate, said first and second leg members only carrying the metal track associated with a single pick-off transducer.

2. The vibrating structure gyroscope as claimed in claim 1, wherein the continuous metal track comprises:

at least a second track section continuing from the substrate along the first leg member, along a section of the annular resonator and along the second leg member back to the substrate, said track sections being connected in series and laterally spaced apart from each other.

3. The vibrating structure gyroscope as claimed in claim 1 wherein each leg member comprises:

first radial section extending inwardly from said substrate, a circumferential section and a second radial section arranged such that the first radial section and the second radial section are connected to one another via the circumferential section, and the second radial section is connected to an external periphery of the annular resonator with said circumferential section located outside said magnetic field.

4. The vibrating structure gyroscope as claimed in claim 3 wherein said second radial sections of the respective leg members are spaced apart with a spacing greater than a length of the second radial sections.

5. The vibrating structure gyroscope as claimed in claim 3 wherein said first radial sections of said respective leg members are spaced apart with a spacing which is less than a length of said first radial sections.

6. The vibrating structure gyroscope, as claimed in claim 1, wherein a ring pole magnetic arrangement is arranged to concentrate the magnetic field on said annular resonator.

7. The vibrating structure gyroscope, as claimed in claim 1, wherein said flexible supports are equiangularly spaced about said annular resonator.

8. The vibrating structure gyroscope, as claimed in claim 1, wherein at least one secondary drive transducer is arranged to null the secondary mode oscillation induced when angular velocity is applied about said axis.

9. The vibrating structure gyroscope, as claimed in claim 1, wherein the annular resonator, the substrate and the support arrangement are substantially coplanar.

10. The vibrating structure gyroscope, as claimed in claim 1, wherein the drive and pick-off transducers are substantially coplanar with one another and with the substrate.

11. The vibrating structure gyroscope, as claimed in claim 1, wherein the leg members are radially compliant legs, each leg member being connected at one end to the substrate and supporting the annular resonator at an other end.

12. The vibrating structure gyroscope as claimed in claim 11 wherein the annular resonator is disposed within the substrate and each leg member extends radially inwardly to an external periphery of the annular resonator from said one end to said other end.

13. The vibrating structure gyroscope as claimed in claim 1, wherein the substrate is sealed to form a sealed cavity encapsulating the annular resonator, the support arrangement and the drive and pick-off transducers.

14. The vibrating structure gyroscope as claimed in claim 1, wherein the support arrangement, the annular resonator and the substrate are formed from silicon.

15. The vibrating structure gyroscope as claimed in claim 1, wherein a portion of the metal track of the at least one drive transducer running along the section of the annular resonator is positioned radially inwardly of portions of the metal track of the at least one drive transducer running, respectively, along the first leg member and the second leg member.

16. The vibrating structure gyroscope as claimed in claim 1, wherein a portion of the metal track of the at least one pick-off transducer running along the section of the annular resonator is positioned radially inwardly of portions of the metal track of the at least one pick-off transducer running, respectively, along the first leg member and the second leg member.

* * * * *